(12) United States Patent
Aichner et al.

(10) Patent No.: US 8,132,307 B2
(45) Date of Patent: Mar. 13, 2012

(54) AIRBAG COVERING HAVING A WEAKENED LEATHER LAYER

(75) Inventors: Rudolf Aichner, Kroning-Kirchberg (DE); Christian Schlemmer, Landshut (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 927 days.

(21) Appl. No.: 12/082,819

(22) Filed: Apr. 14, 2008

(65) Prior Publication Data

US 2008/0276445 A1 Nov. 13, 2008

(30) Foreign Application Priority Data

Apr. 13, 2007 (DE) .................. 10 2007 017 602

(51) Int. Cl.
*B68G 7/00* (2006.01)
(52) U.S. Cl. ........................................................ 29/91.1
(58) Field of Classification Search .............. 29/91, 428, 29/448, 458, 460, 557, 91.1; 83/875–878; 280/728.2, 732
See application file for complete search history.

(56) References Cited

U.S. PATENT DOCUMENTS

| | | | | |
|---|---|---|---|---|
| 5,316,822 A * | 5/1994 | Nishijima et al. | ............. | 428/138 |
| 5,632,914 A * | 5/1997 | Hagenow et al. | ......... | 219/121.71 |
| 6,423,933 B2 * | 7/2002 | Nicholas et al. | ............ | 219/121.7 |
| 7,625,004 B2 * | 12/2009 | Geltinger et al. | ........... | 280/728.3 |
| 7,810,836 B2 * | 10/2010 | Muller et al. | ............... | 280/728.2 |
| 2007/0018435 A1 * | 1/2007 | Muller et al. | ................ | 280/728.3 |
| 2009/0243264 A1 * | 10/2009 | Kaulbersch | ................ | 280/728.3 |

FOREIGN PATENT DOCUMENTS

| | | | |
|---|---|---|---|
| DE | 19944371 A1 * | 3/2001 | |
| DE | 1004007282 A1 | 9/2005 | |
| DE | 1005013477 A1 | 10/2006 | |
| EP | 1564075 A2 * | 8/2005 | |
| EP | 1705076 A1 | 3/2006 | |
| EP | 1745989 A1 | 6/2006 | |
| JP | 11-078751 A | 3/1999 | |
| JP | 11-170951 A | 6/1999 | |

OTHER PUBLICATIONS

Jewitt, Jeff. Shellac—A Traditional finish still yields super results. Publicly available on internet since Apr. 6, 2005. Source:http://web.archive.org/web/20050406003654/http://www.assoc-restorers.com.*
European search report from corresponding application EP1980455 dated Mar. 23, 2011.

* cited by examiner

*Primary Examiner* — John C Hong
(74) *Attorney, Agent, or Firm* — Wolf, Greenfield & Sacks, P.C.

(57) ABSTRACT

A process for producing an airbag covering having a leather layer, particularly for use in a motor vehicle, with a partial weakening for the initiation of a tear and/or the propagation thereof along a previously defined path is disclosed. In one embodiment, a skived region is introduced into the leather layer and at least one incision is introduced into the previously created skived region.

25 Claims, 7 Drawing Sheets

AIRBAG COVERING HAVING A WEAKENED LEATHER LAYER

CROSS REFERENCE TO RELATED APPLICATION

Foreign priority benefits are claimed under 35 U.S.C. §119 (a)-(d) of German Application No. DE 10 2007 017 602.5, filed Apr. 13, 2007, which is hereby incorporated by reference in its entirety.

BACKGROUND

1. Field

Aspects of the invention relate to processes for producing an airbag covering having a leather layer, particularly for use in a motor vehicle. Aspects of the invention also relate to partial weakening, formed in the leather layer, for the initiation of a tear and/or the propagation thereof along a previously defined path.

2. Discussion of Related Art

Airbag coverings used in a motor vehicle are normally located in the region of the instrument panel, in the steering wheel, in the doors and seats or the vehicle's roof lining and should have an appealing visual appearance while not obstructing or interfering substantially with the airbag's deployment in the event of actuation.

In the upscale executive and luxury motor vehicle classes, particular value is placed on the visual appearance of such airbag coverings. Attempts were made to produce airbag coverings that were not discernible by vehicle passengers and that were completely integrated into the surrounding areas particularly in the region of the instrument panel. Nevertheless, even in these cases, the continuously formed decor materials were intended to tear open along a previously defined line, thus ensuring that coverings and covering parts can lift off and allowing complete deployment of the airbag.

In the past, it had become established practice that such tear lines were sewn and subsequently an incision (using blades) was made on the rear. The disadvantage, however, was that, with the changes in temperature and varying intensities of irradiation acting on such airbag coverings, after some time had passed, the tear lines began to show through and thus the goal of making the airbag coverings permanently invisible within the decor material was not obtained.

Examples of visible airbag coverings may be found, for example, in DE 195 16 230 C2 in which the tear initiation and propagation region in the airbag covering is realized by a constriction of the material both in the region of the essentially dimensionally stable decor substrate and in the decor material disposed above the substrate.

Furthermore, EP 07 116 27 B1, for example, discloses a device and a process for introducing the incisions in the airbag covering by means of laser beams from the side facing away from the passenger of the vehicle. In this regard, a series of blind holes are aligned with each other so as to create tear lines in a layered composite. A laser beam, which is also intended to penetrate the uppermost layer of the decor material at least in part, would need such a high output, however, that it could likewise penetrate all the layers disposed thereunder. The energy input into the entire airbag covering was thus so high that it was not possible to prevent fusions at least of partial regions and ablations of material and as a result it was not possible to permanently guarantee the appearance of the airbag covering in the desired manner. In those cases where the laser did not also weaken the uppermost layer of the decor material, there was too great a force counteracting deployment of the airbag such that it was not possible to guarantee complete and unobstructed airbag deployment.

The difficulty of controlling and regulating such lasers is described by way of example in DE 196 36 429 C1.

The necessity for applying energy outputs that are as low as possible when introducing blind holes or through holes in decor materials is increased still further when using leather or leather-like materials. In this regard, due to the fact that leather is a natural material, it has local variations in properties and anisotropies, for example in respect of stretching behavior, material density and the like. Thus, depending on the grain of the leather, it must be ensured that a desired residual wall thickness of the leather material is also guaranteed in those regions in which the grain of the leather leads to particularly deep incisions from the visible side. This is regularly not guaranteed by the prior art with the desired reliability and safety.

SUMMARY

According to one embodiment, a process for producing an automotive vehicle airbag covering having a leather layer with partial weakening for the initiation and propagation of a tear along a previously defined path is provided. The method includes introducing a skived region into the leather layer and introducing at least one incision into the skived region.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. Various embodiments of the invention will now be described, by way of example, with reference to the accompanying drawings. These embodiments do not, however, restrict the scope of the invention and they serve merely for illustrative purposes. Rather, the scope of the invention(s) is/are defined in the attached claims. In the Figures:

FIG. 2b is a plan view of an instrument panel showing a tear line in the airbag covering of FIG. 2a;

FIG. 3b is a plan view of an instrument panel showing a tear line and a weakened area in the airbag covering of FIG. 3a;

FIG. 7b is a plan view of an instrument panel showing a tear line in the airbag covering FIG. 7a.

DETAILED DESCRIPTION

Aspects of the invention are directed to a process for producing an airbag covering having a leather layer with partial weakening. In this manner, tears are introduced at previously defined points and are propagated along previously defined paths, promoting safe and unobstructed deployment of the airbag in the event of actuation. In addition, such weakenings introduced into the leather material are not noticeable in the airbag covering.

In one embodiment, the process includes introducing a weakened area formed as a reduced thickness region (i.e., skived region) into the leather layer enabling the setting of a residual thickness of the leather layer at least in partial regions. The skived region may be introduced using any suitable technique, as the present invention is not limited in this respect, for example, the leather may be cut or carved out (such as by skiving) such that upon removal of the unwanted leather material, the remaining leather has a weakened area having a reduced thickness. At least one further incision is introduced into the leather layer in the previously created skived regions in order to amplify the locally defined weakening of the leather material.

In one embodiment, the penetration of the at least one incision may be carried out in any of a variety of suitable ways. In particular, in one embodiment, the incisions are formed as blind holes that do not completely penetrate the leather layer and that are aligned with each other centrally in the previously introduced skived region. It should be appreciated that aspects of the invention are not limited to circular cross-section shaped blind holes, as any suitably shaped hole may be employed. For example, in one embodiment, the blind holes may have an elongated cross-section.

It should also be appreciated that the shape and elongation of the skived region is not limited; however, in some circumstances it may be advantageous if the skived region extends along the entire tear line of the airbag covering. Also, in some instances, it may be desirable to form the transition from non-skived region to skived region as being a gradual transition (i.e., where the cross-section is not an abrupt transition). In one embodiment, the transition from non-skived region to skived region is designed in such a way that transitions are defined with an edge angle of greater than 90°, as will be described in greater detail below. This may be formed, for example, by creating beveled surfaces at the marginal regions of the skived region.

In an alternative embodiment, the skived region has the shape of a circle segment, also providing a gentle transition from the non-skived to the skived region. In this regard, it should be appreciated that the larger the radius of the circle segment, the gentler the transition from non-skived to skived region. In yet another embodiment, the transition from non-skived to skived region does not include any edges at all. In another embodiment, the leather layer is weakened over the whole surface whereby the skived region extends over the entire area of the leather layer.

In one embodiment, the skived region and the accompanying at least partial removal of material up to a desired residual thickness of the leather material and incision(s) into the skived region may be formed with a beam process (e.g., laser beam). The inventors have discovered that the input of energy and/or media into the leather layer by the beam process can be restricted to a necessary minimum such that the incisions can be created with a very precisely controllable geometry and depth. Furthermore, the effect on the surrounding regions of the incision is reduced, thereby providing an unchanging appearance of the leather decor.

The residual thickness in the skived region may be set based on prevailing circumstances, for example the strength of the leather material, the size of the airbag propellant or the length of the desired tear. In one embodiment, the residual thickness of the leather layer is between approximately 0.15 mm and approximately 0.6 mm in the skived region. In one embodiment, the residual thickness of the leather layer is between approximately 0.15 mm and approximately 0.3 mm. It should be appreciated that the residual thickness is determined in the region of maximum removal. As a result, a process is provided wherein the residual thickness of the leather layer provides sufficient stability and tear-resistance, for example, under mechanical load, which may act on the airbag covering. At the same time, safe deployment of the airbag along the desired tear line in combination with the incisions in the skived area is maximized.

The at least one incision may be formed continuously or discontinuously by the formation of ligaments between individual incisions, as the present invention is not limited in this respect. Furthermore, in one embodiment, a plurality of incisions or a single incision is formed or aligned with each other such that the incision or incisions cross the weakened region and thus are disposed only partially within the weakened region. In this regard, the incisions may be disposed in an alternating manner about the main direction in which the skived region extends and periodically crosses the skived region in a sinusoid or meandering pattern. In one embodiment, the incisions are disposed offset only on one side of the main direction in which the skived region extends. For example, with a sinusoidal pattern of the incisions, the incisions meet the skived region on every second vertex of the curve.

In each of these embodiments, the geometry of the incisions themselves or their relative alignment to each other is matched to the skived region and the skived region thus undergoes an additional weakening due to one or a plurality of the incisions.

As mentioned, the introduction of the incision or incisions is not limited to any particular process. In one embodiment, the incisions may be formed using a water jet acting on the rear of the leather layer. The use of a water jet may enable easy control and permit accurately defined precise cutting geometries. In addition, any potential negative impact on the surrounding regions is minimized. In particular, when carrying out this process, material ablation and fusion of marginal regions of the incision is reduced or completely eliminated. Thus, a partial weakening remains in the airbag covering, which is characterized by accurate and precise geometries with minimal removal of material volume.

In an alternative embodiment, introduction of the at least one incision into the previously skived leather layer is carried out by means of a laser beam which impinges on the leather layer from the rear. In this manner, a process that is accurately controllable and that ensures very small and clearly defined incision geometries is provided.

In both embodiments, the introduction of incisions by means of a water jet or by means of a laser beam makes it possible to create perforations or blind holes within the leather material that comprise a diameter ranging between approximately 0.005 mm and approximately 0.1 mm. Such orders of magnitude are almost invisible to the naked eye yet nevertheless facilitate the desired additional weakening of the airbag covering's leather layer.

In another embodiment, the airbag covering is formed as a composite of a plurality of layers whereby at least one intermediate layer is disposed between the leather layer as decor material and an essentially inherently stable decor substrate. This intermediate layer, in one embodiment, has a tear resistance that is significantly lower than that of the leather layer. In one embodiment, the intermediate layer includes at least one of a non-woven textile fabric, a spacer fabric, a foam layer (for example of polyurethane) or a film. As a result, it is possible to modify the haptics of the entire airbag covering in almost any suitable manner. For example, the indentation depth and behavior and the displacement resistance of the airbag covering can be determined or designed in to the airbag covering. In one embodiment, the intermediate layer may comprise a gas-permeable intermediate layer. In such an embodiment, temperature regulation of the airbag covering and/or discharge of combustion or evaporation gases when using lasers to introduce weakenings can be obtained.

In one embodiment, the thickness and outline of the at least one intermediate layer is selected such that, as a result the removal of material from the leather, material is compensated completely in the skived region. As a result, an airbag covering having a substantially constant thickness is provided, ensuring that the tear line is not significantly visible or tangible in the airbag covering.

In a further embodiment, additional weakenings are also introduced into the decor substrate of the airbag covering whereby these weakenings need not necessarily correspond to the weakenings in the leather layer. In fact, it is possible that such an additional weakening of the decor substrate assists the tear behavior of the entire airbag covering as well as the behavior of a region of the airbag covering that lifts off in the event of the airbag being actuated.

According to another embodiment, the leather layer is pretreated in an appropriate manner following introduction of the skived region and prior to introduction of the at least one incision. The pre-treatment may be employed to stiffen the leather material in the skived region. Such a pre-treatment may be carried out, for example, by spraying on an appropriate agent. A suitably designed mask onto the region to be treated may also be employed. Other arrangements for pretreating the leather layer may be employed, as the present invention is not limited in this respect.

In another embodiment, the pre-treatment is carried out by spraying on a colorant, which may also cause the treated region to stiffen. The colorant chosen may correspond to the transmission and absorption behavior of the leather material when using a laser to introduce the at least one incision. Thus, changing the color may change the transmission/absorption characteristics of the leather. Moreover, such an agent may also prevent or reduce an undesirable burn-off of marginal regions surrounding the at least one incision. As a result, it is possible to create an incision having precisely defined geometries and substantially unaffected marginal regions. In any case, this helps with the relative permanence of the appearance of the weakened airbag covering.

The skived region and the incision(s) into the previously created skived region can be formed using any suitable device, as the present invention is not limited in this respect. In one embodiment, the leather layer is mounted on a support at least to form the at least one incision so as to provide relative motion of the tool in relation to the leather layer for introducing the incision. In one embodiment, the leather layer is mounted on a suitable support under the action of a vacuum. This provides a process that is particularly gentle on the material and which furthermore enables secure mounting and detachment of the leather layer.

As mentioned, the airbag covering may comprise a plurality of layers whereby the weakened leather layer acts as the decor material. In one embodiment, the airbag covering is created by bonding the leather layer (after introduction of the skived region and of the at least one incision into the leather layer) onto a decor substrate or onto a composite of the decor substrate and one or a plurality of intermediate layers. Further weakenings may be subsequently introduced into the composite of the airbag covering to the extent that this is desirable for setting specific actuation characteristics.

Figure 1:
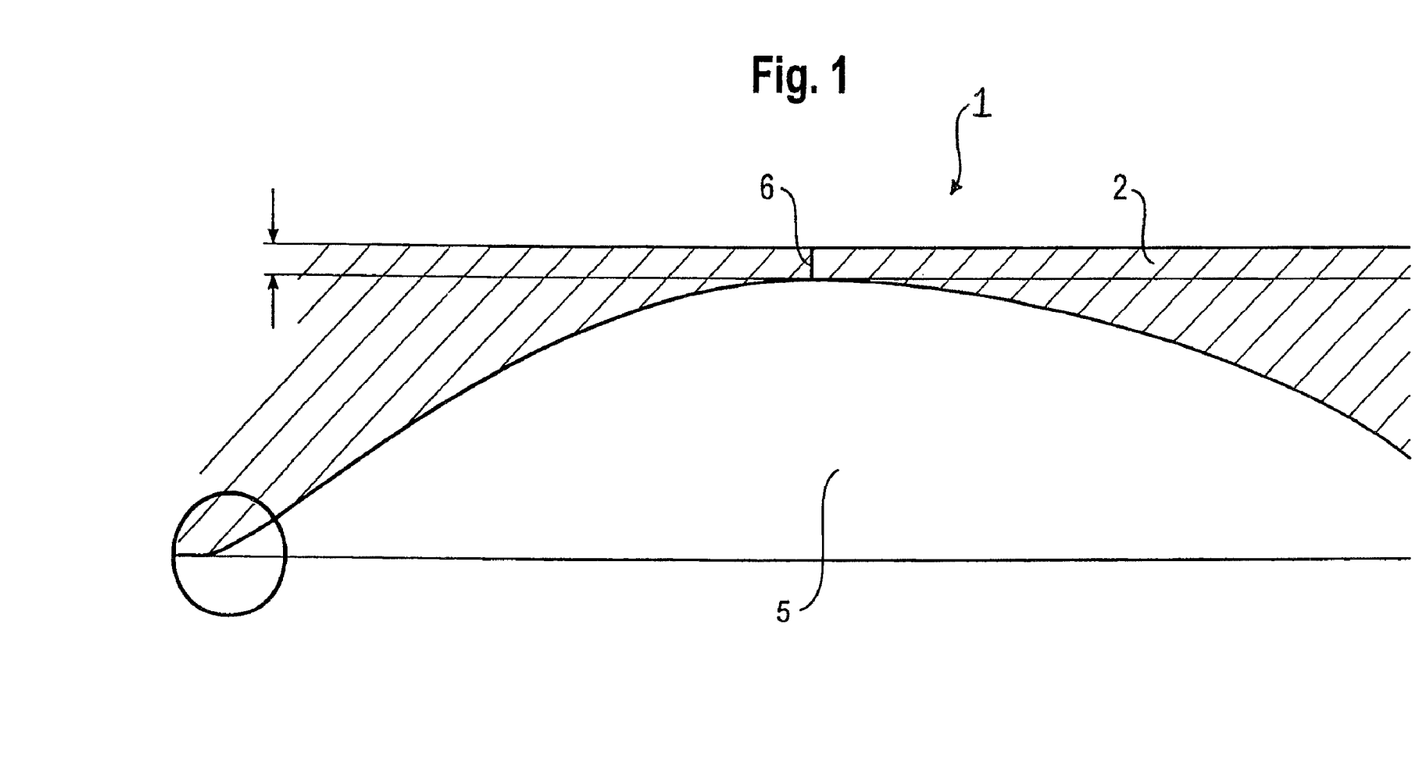
FIG. 1 is a schematic cross-sectional view through a skived region of a leather layer of an airbag covering.

Turning now to the figures and in particular to FIG. 1, a schematic cross-sectional view of a leather layer 2 for an airbag covering 1 into which a skived region 5 has been introduced is shown. Skived region 5 in this embodiment traces a circle segment and the transition from non-skived region (on the left in the figure, emphasized by the circle) to skived region 5 may be formed continuously without the formation of an edge and/or with an edge, represented here in an exaggerated manner. The residual thickness of leather layer 2 in this embodiment is between approximately 0.3 mm and approximately 0.6 mm. In the region of the minimum residual wall thickness above the vertex of the circle segment illustrated, an incision 6 has been introduced into leather layer 2. The incision 6 substantially runs through the entire thickness of remaining leather layer 2.

Figure 2A:
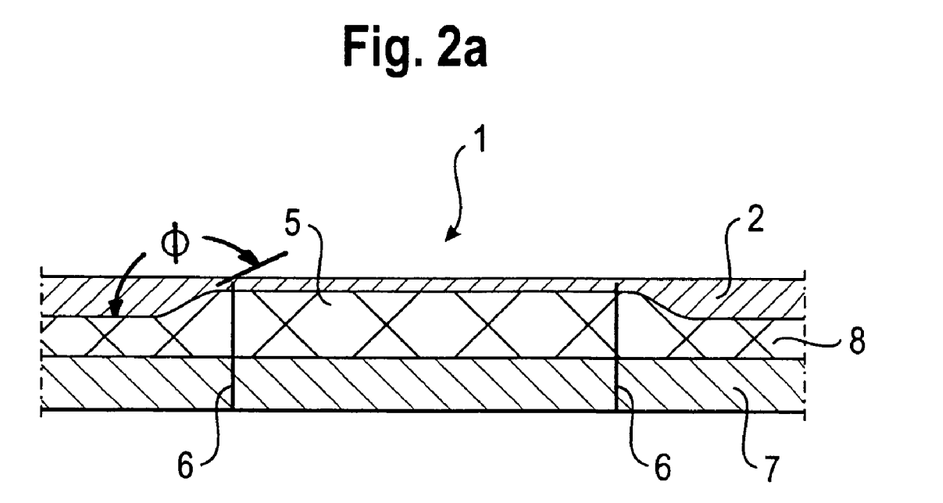
FIG. 2a is a schematic cross-sectional view through an airbag covering.

FIG. 2a shows a schematic sectional view of an airbag covering 1 which has been created using one illustrative embodiment of the process. A wide skived region 5 has been introduced into leather layer 2 in such a manner that the transition from non-skived region of leather layer 2 (on the left and right of the figure) to the centrally disposed skived region 5 using two surfaces inclined towards skived region 5. The transition from non-skived region to skived region 5 occurs symmetrically on both sides and is formed at an angle $\Phi$ greater than 90° (that is, not perpendicular). Leather layer 2 is applied onto an intermediate layer 8 made from a spacer fabric whereby the thickness of spacer fabric 8 is designed such that it corresponds to the cross-sectional geometry of leather layer 2 and completely compensates skived region 5 (weakened area) in its thickness. Thus, it is possible by applying the partial composite of leather layer 2 and spacer fabric 8 to decor substrate 7 to create an airbag covering 1 having a constant thickness. Incisions 6 are also introduced into the composite of leather layer 2, spacer fabric 8 and decor substrate 7. As shown, the incisions are formed symmetrically about the center of skived region 5, though the present invention is not limited in this respect. In this embodiment, the incisions are formed as blind holes within leather layer 2 and thus not completely penetrating the leather layer 2.

Figure 2B:
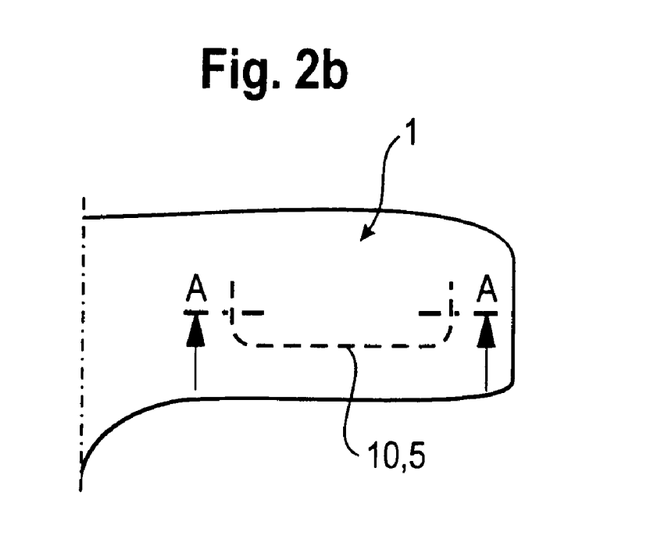

FIG. 2b shows a partial view of an instrument panel which is covered with an airbag covering 1. Within airbag covering 1 a tear line 10 is shown, which runs along the skived region 5. FIG. 2a is a section through the airbag covering 1 taken along section A-A of FIG. 2b.

Figure 3A:
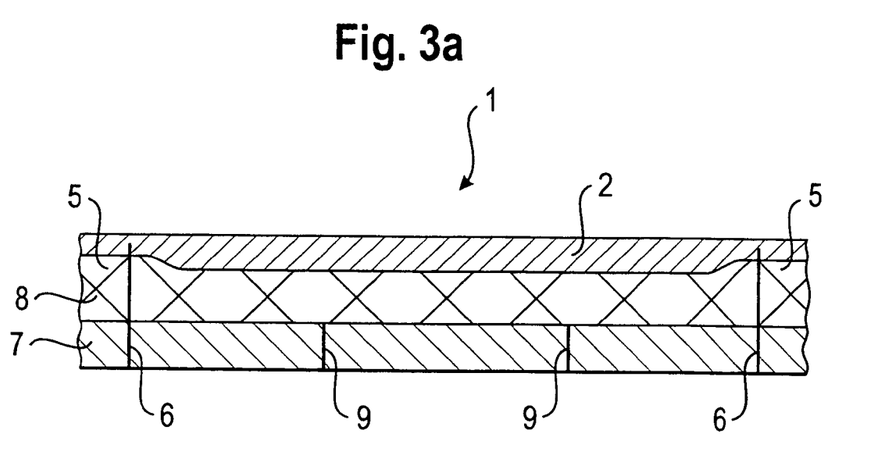
FIG. 3a is a schematic cross-sectional view of a further embodiment of an airbag covering.

FIG. 3a shows an airbag covering 1 formed according to another embodiment. In this embodiment, airbag covering 1 is similar to the embodiment shown in FIG. 2 and has a leather layer 2 and a decor substrate 7 between which an intermediate layer 8, such as a spacer fabric is disposed. In this embodiment, the cross-sectional geometry of spacer fabric is selected such that the removal of material from leather layer 2 in the skived region 5 is fully compensated in order to obtain an airbag covering 1 with a generally constant thickness. In this embodiment, skived regions 5 are introduced into leather layer 2 so as to be symmetric about the center of the region illustrated so that a skived region is formed on the left in the figure and a skived region is formed on the right in the figure.

In this embodiment, the transition from non-skived region to skived region 5 is realized by the formation of sloping transition areas. In the area where the skived region is a maximum, incisions 6 are introduced into airbag covering 1 in the form of blind holes, which run through decor substrate 7 as well as spacer fabric 8 but do not completely penetrate leather material 2. In one embodiment, two further weakenings 9 are introduced into the decor substrate 7 and are disposed towards the center of the airbag covering 1 and below the non-skived region of leather layer 2.

Figure 3B:
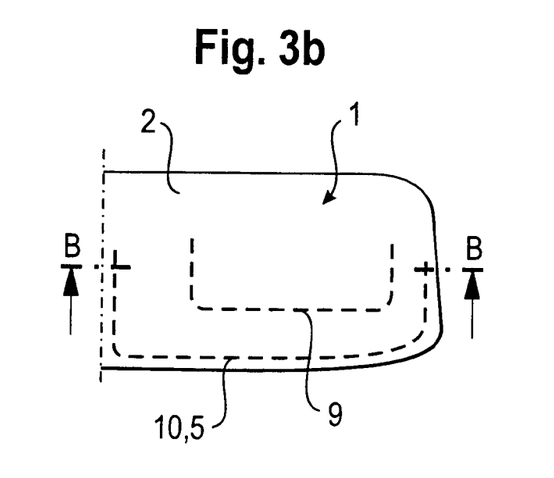

FIG. 3b shows a schematic view of airbag covering 1 from above. FIG. 3a is a sectional view taken along section B-B of FIG. 3a. As illustrated, in one embodiment, tear line 10 follows a U-shaped course, which runs along skived region 5. A similar U-shaped course of substrate weakening 9 disposed offset in relation to tear line 10 is formed in the airbag covering 1. In the event of actuation of an airbag (not shown), airbag covering 1 tears open along tear line 10 and weakening 9 when the airbag covering 1 flips up. In this regard, however, there is no complete tearing open or ripping of the entire airbag covering 1 and particularly of leather layer 2 along weakening 9.

Figure 4:
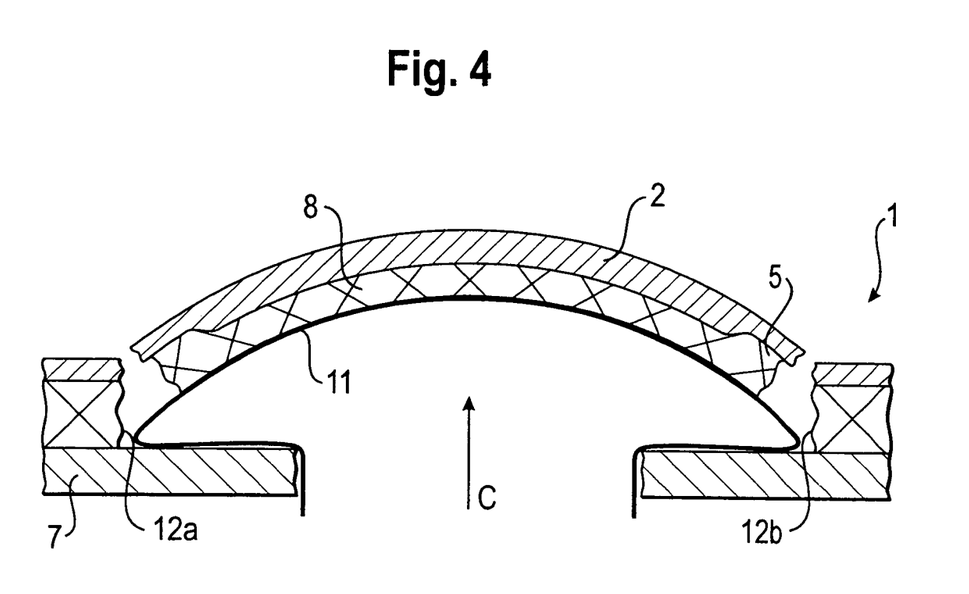
FIG. 4 is a schematic cross-sectional view of an airbag covering showing a first stage of airbag actuation.

FIG. 4 shows a schematic side view of an embodiment of airbag covering 1 showing airbag 11 in a first stage of its deployment. A propellant (not shown) causes an expansion of airbag 11 substantially in the direction of arrow C, thus directed against the underside of airbag covering 1. The force exerted by airbag 11 on airbag covering 1 causes the airbag covering 1 to tear in skived region 5 of leather layer 2. Spacer fabric 8 (disposed between decor substrate 7 and leather layer 2) does not substantially resist deployment of the airbag. Spacer fabric 8 tears open completely along tear lines 12a, 12b illustrated. Leather layer 2 and the spacer fabric 8 disposed underneath leather layer 2 deform, following the external outline of airbag 11, and lifts off from airbag covering 1 in the form of a curved surface, as shown.

Figure 5A:
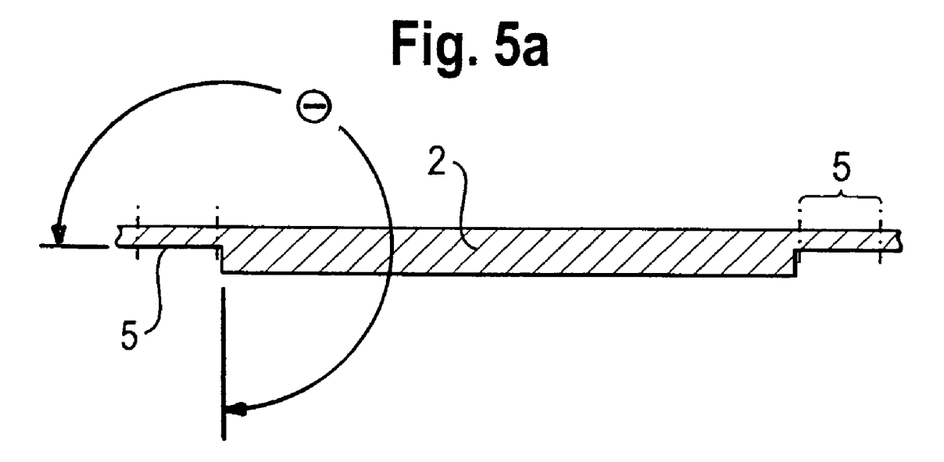
FIGS. 5a and 5b are schematic cross-sectional views of further embodiments showing two skived regions introduced in the leather layer.

FIG. 5a shows an embodiment of a leather layer 2 with a skived region 5 whereby the transition from skived region 5 to the non-skived region (in the center of the Figure) of leather layer 2 is formed in steps having an angle Θ (and in one embodiment with substantially greater than 90° angles, such as, for example, 270° angles).

Figure 5B:
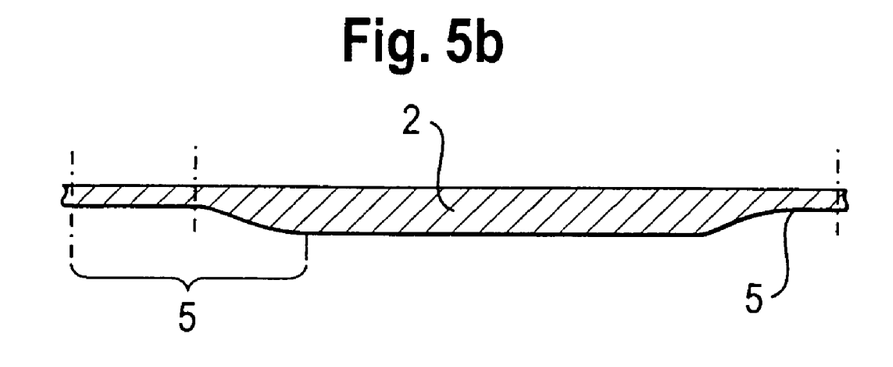

FIG. 5b shows another embodiment of a leather layer 2 in which continuous transitions from the non-skived region (in the center of the Figure) to skived regions 5 (on the right and left in the Figure) are formed such that only faintly pronounced edges are produced. As can be seen by comparing FIGS. 5a and 5b, in FIG. 5b the entire skived region is broadened, as compared to the stepped embodiment of FIG. 5a.

Figure 6:
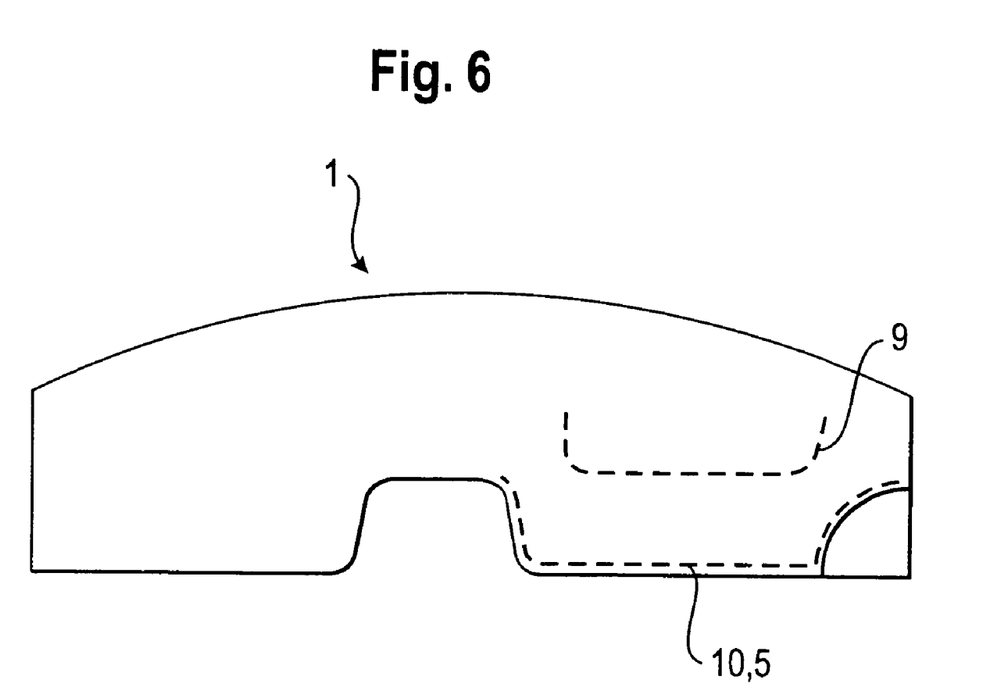
FIG. 6 is a schematic view of an instrument panel showing a tear line and a weakened area in an airbag covering.

FIG. 6 shows an instrument panel which is covered with an airbag covering 1 formed in accordance with an embodiment of a process according to an aspect of the invention. In this embodiment, a U-shaped weakening is introduced within the decor substrate (not shown) and is disposed at the center, similar to the embodiment described with reference to FIG. 3b. However, in this embodiment, the weakening 9 extends through the entire airbag covering 1. A tear line 10 is disposed in the decor substrate (not shown) and beneath the weakening 9. A skived region 5 runs along the tear line 10. Thus, airbag covering 1 tears along the skived region 5 and the tear line 10 in the event of actuation of the airbag (not shown). The course of tear line 10 is specified in this case by the external outline of instrument panel 1 and runs substantially equidistant from the closing edges of the instrument panel to the central console (left), to the lower closing edge of the instrument panel (bottom) and in the transition area to a lateral ventilator (not shown) (on the right in the Figure).

Figure 7A:
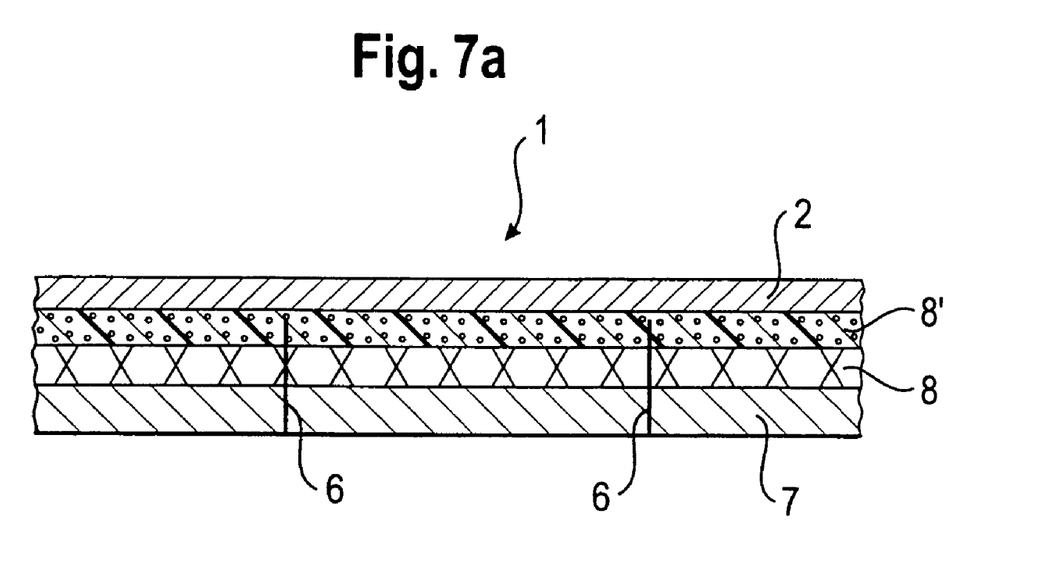
FIG. 7a is a schematic cross-sectional view of a further embodiment of an airbag covering.

FIG. 7a shows a further embodiment of an airbag covering 1 created using an illustrative process. FIG. 7a is a schematic cross-section taken along line A-A of FIG. 7b. Airbag covering 1 shown here includes of a layered composite comprising a decor substrate 7 and a leather layer 2 applied on the visible side of the airbag covering 1. In this embodiment, leather layer 2 is weakened over the entire surface such that its skived region extends over the entire surface of leather layer 2. A layer 8 made from spacer fabric is disposed between leather layer 2 and decor substrate 7. A foam layer 8', which in this embodiment, is made from polyurethane, is disposed above layer 8, whereby the haptics of airbag covering 1 are defined by the composite of spacer fabric 8 and foam layer 8'. Two incisions 6 are formed in the airbag covering and run parallel and aligned so as to be perpendicular to the surface extension of airbag covering 1. In one embodiment, the incisions are introduced by means of a laser into the composite of airbag covering 1. The incisions are formed such that each has the same length. Each incision 6 runs through decor substrate 7 and layer 8 of spacer fabric and end within foam layer 8'. Thus, the incision terminates beneath leather layer 2. In this embodiment, the spacer fabric of layer 8 may serve both for discharging combustion gases and for supplying inert or similar gases. In this embodiment, foam layer 8', made from polyurethane, provides desired properties and allows the incisions to be made by means of laser.

Figure 7B:
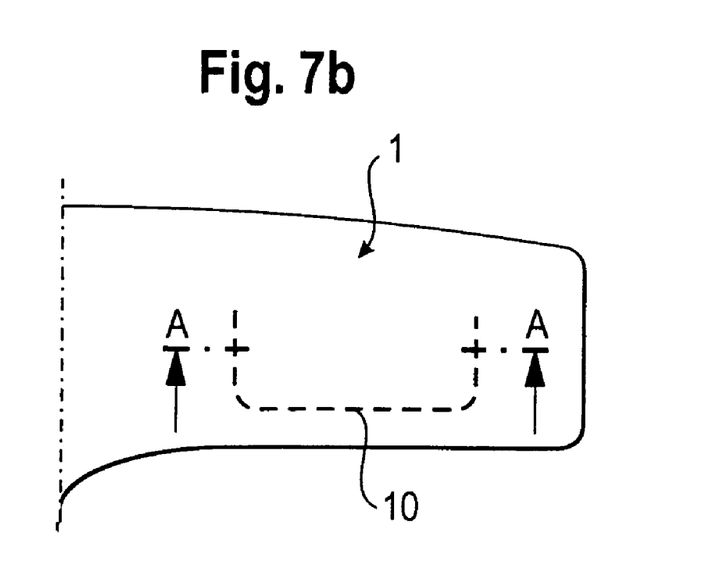

FIG. 7b shows a section of the instrument panel covered with the airbag covering 1 of FIG. 7a. From FIG. 7b it is also possible to discern the essentially U-shaped course of tear line 10, the section of which is illustrated along line A-A in FIG. 7a.

Having thus described several aspects of at least one embodiment of this invention, it is to be appreciated various alterations, modifications, and improvements will readily occur to those skilled in the art. Such alterations, modification, and improvements are intended to be part of this disclosure, and are intended to be within the spirit and scope of the invention. Accordingly, the description and drawings herein are by way of example only.

What is claimed is:

1. A process for producing an automotive vehicle airbag covering having a leather layer with a weakening for the initiation and propagation of a tear along a previously defined path, the method comprising:
   introducing a skived region into the leather layer; and
   introducing at least one incision into the skived region.

2. The process according to claim 1, wherein the residual thickness of the leather layer in the skived region is between approximately 0.15 mm and approximately 0.6 mm.

3. The process according to claim 1, wherein introducing the skived region into the leather layer comprises introducing a skived region into a first portion of the leather layer such that a second portion of the leather layer has a non-skived region; the method further comprising forming a transition from the non-skived region to the skived region as step.

4. The process according to claim 1, wherein introducing the at least one incision comprises introducing the at least one incision at least partially outside the skived region.

5. The process according to claim 1, wherein introducing the at least one incision comprises forming the at least one incision as a blind hole.

6. The process according to claim 5, wherein forming the at least one incision as a blind hole comprises forming a plurality of aligned blind holes.

7. The process according to claim 1, wherein introducing the at least one incision comprises forming the at least one incision as a through hole.

8. The process according to claim 7, wherein forming the at least one incision as a through hole comprises forming a plurality of aligned through holes.

9. The process according to claim 1, wherein introducing the at least one incision comprises introducing the at least one incision into the leather layer by means of a water jet.

10. The process according to claim 1, wherein introducing the at least one incision comprises introducing the at least one incision into the leather layer by means of a laser beam.

11. The process according to claim 1, further comprising disposing a decor substrate and at least one intermediate layer adjacent the leather layer, with the at least one intermediate layer being disposed between the leather layer and the decor substrate.

12. The process according to claim 11, further comprising introducing the at least one incision through the decor substrate and the at least one intermediate layer.

13. The process according to claim 11, further comprising forming the at least one intermediate layer with a thickness and outline such that a thickness of the airbag covering is substantially constant.

14. The process according to claim 11, further comprising forming the at least one intermediate layer as a foam layer of polyurethane.

15. The process according to claim 11, further comprising introducing weakenings into the decor substrate and disposing the weakenings offset from the at least one incision.

16. The process according to claim 1, further comprising bonding the leather layer to at least one additional layer following introducing the skived region and prior to introducing the at least one incision.

17. The process according to claim 1, further comprising treating the leather layer following introducing the skived region and prior to introducing the at least one incision.

18. The process according to claim 17, wherein treating the leather layer comprises spraying an agent on the leather layer, the agent assisting introducing the at least one incision.

19. The process according to claim 17, wherein treating the leather layer stiffens at least a portion of the leather layer for introducing the at least one incision.

20. The process according to claim 17, wherein treating the leather layer comprises applying a colorant.

21. The process according to claim 1, further comprising mounting the leather layer on a support at least for introducing the at least one incision.

22. The process according to claim 21, further comprising assembling the airbag cover, wherein assembling the airbag cover comprises bonding the leather layer to at least one additional layer after introducing the skived area and prior to introducing the at least one incision.

23. The process according to claim 21, wherein mounting the leather layer on the support comprises applying a vacuum on the leather layer.

24. The process according to claim 1, wherein the residual thickness of the leather layer in the skived region is between approximately 0.15 mm and approximately 0.3 mm.

25. The process according to claim 1, wherein introducing the skived region into the leather layer comprises introducing a skived region into a first portion of the leather layer such that a second portion of the leather layer has a non-skived region; the method further comprising forming a transition from the non-skived region to the skived region is continuous.

* * * * *